US008032667B2

(12) United States Patent
Takei

(10) Patent No.: US 8,032,667 B2
(45) Date of Patent: Oct. 4, 2011

(54) COMMODITY SALES DATA PROCESSOR SYSTEM HAVING CAMERA FOR PICKING UP USER IMAGE AND USB STORAGE DEVICE CONNECTOR FOR STORING DATE AND TIME OF USER TRANSACTIONS

(75) Inventor: Yuuri Takei, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 221 days.

(21) Appl. No.: 12/356,926

(22) Filed: Jan. 21, 2009

(65) Prior Publication Data

US 2009/0192908 A1 Jul. 30, 2009

(30) Foreign Application Priority Data

Jan. 24, 2008 (JP) ................................. 2008-014189

(51) Int. Cl.
*G06F 13/00* (2006.01)
*G06F 17/60* (2006.01)
*G06Q 20/00* (2006.01)
(52) U.S. Cl. ................ 710/16; 710/15; 710/17; 710/18; 710/19; 705/41; 705/43; 705/18; 382/118; 235/380
(58) Field of Classification Search .............. 710/15–19; 705/41, 43; 382/118; 235/380
See application file for complete search history.

(56) References Cited

U.S. PATENT DOCUMENTS

| 5,491,511 | A | * | 2/1996 | Odle ............................. 348/153 |
| 5,761,329 | A | * | 6/1998 | Chen et al. .................... 382/116 |
| 6,424,249 | B1 | * | 7/2002 | Houvener .................... 340/5.82 |
| 6,438,696 | B1 | * | 8/2002 | Baran et al. .................... 726/22 |
| 6,786,398 | B1 | * | 9/2004 | Stinson et al. ................ 235/379 |
| 6,793,128 | B2 | * | 9/2004 | Huffman ....................... 235/375 |
| 6,976,032 | B1 | * | 12/2005 | Hull et al. .............. 707/999.104 |
| 7,130,454 | B1 | * | 10/2006 | Berube et al. ................. 382/118 |
| 7,304,662 | B1 | * | 12/2007 | Sullivan et al. ............... 348/150 |
| 7,454,041 | B2 | * | 11/2008 | Sukegawa et al. ............ 382/118 |
| 2004/0024709 | A1 | * | 2/2004 | Yu et al. ......................... 705/43 |
| 2008/0199053 | A1 | * | 8/2008 | Zafar ............................ 382/115 |

FOREIGN PATENT DOCUMENTS

| CN | 1783039 | 6/2006 |
| CN | 2881803 | 3/2007 |
| JP | 11073312 | 3/1999 |
| JP | 2002149263 | 5/2002 |
| JP | 2005346546 | 12/2005 |
| JP | 2006031287 | 2/2006 |
| JP | 2007-148762 | 6/2007 |

OTHER PUBLICATIONS

Japanese Office Action dated Aug. 18, 2009, corresponding to U.S. Appl. No. 12/356,926, filed Jan. 21, 2009.
Chinese Office Action mailed Aug. 13, 2010, corresponding to U.S. Appl. No. 12/356,926, filed Jan. 21, 2009.

* cited by examiner

*Primary Examiner* — Tammara Peyton
(74) *Attorney, Agent, or Firm* — Turocy & Watson, LLP

(57) ABSTRACT

Connection of a USB memory (storage device) to a USB port (data transmitting and receiving unit) is detected and the date and time of detection of this connection is stored. Using this detection of connection as trigger, a camera is caused to pick up an image of an area embracing a user positioned in a position where the user can operate a user interface. Picked-up image data outputted from the camera is stored together with shooting date and time.

2 Claims, 7 Drawing Sheets

COMMODITY SALES DATA PROCESSOR SYSTEM HAVING CAMERA FOR PICKING UP USER IMAGE AND USB STORAGE DEVICE CONNECTOR FOR STORING DATE AND TIME OF USER TRANSACTIONS

CROSS REFERENCE TO RELATED APPLICATION

The present application is based on and claims the benefit of priority of Japanese Patent Application No. 2008-014189 filed on Jan. 24, 2008, the entire contents of which is incorporated herein by reference.

TECHNICAL FIELD

The present invention relates to a commodity sales data processor, such as POS terminal, that is introduced in stores, such as supermarkets and shopping malls, and used by multiple clerks.

BACKGROUND

Commodity sales data, which is accumulated in a POS terminal or the like every day, accurately reflects the state of sales at the relevant store and thus provides material very helpful in plotting a sales strategy. For this reason, the value of commodity sales data has been highly increased in the retail trade and the like operating supermarkets or the like.

As the value of commodity sales data is increased as mentioned above, more and more wrongdoers have attempted to improperly run away with commodity sales data from a POS terminal. Common POS terminals are identical with PCs in configuration. Therefore, many of them are provided with a data transmitting and receiving unit (for example, USB port) to which a storage device (for example, USB memory) can be connected. It is easy to connect a storage device to a POS terminal and copy and run away with commodity sales data.

In stores, such as supermarkets, one POS terminal is operated by multiple users as a rule. Therefore, even though it is revealed that an unjustifiable act has been carried out and an attempt is made to find out the wrongdoer, it is very difficult.

Japanese Unexamined Patent Publication No. 2007-148762 discloses a technique for making a specific PC unusable unless a specific storage device is connected to the PC. If this storage device is stolen by a wrongdoer, however, it is impossible to find out the true criminal.

SUMMARY

Accordingly, an object of the present invention is to make it possible to easily find out a wrongdoer who connects a storage device to a commodity sales data processor, such as POS terminal, and copies and runs away with data.

According to the present invention, the novel commodity sales data processor of the invention includes: a user interface having an information input function; a camera picking up an image of an area embracing a user positioned in a position where the user can operate the user interface and outputting picked-up image data; and a data transmitting and receiving unit allowing a storage device for rewritably storing data to be connected and enabling data communication with the storage device. The commodity sales data processor carries out: a detecting process of detecting connection of the storage device to the data transmitting and receiving unit; a process of storing the date and time of detection of the connection in a predetermined storage area; and a process of, when the connection is detected, controlling and causing the camera to pick up an image and storing picked-up image data outputted from the camera and shooting date and time together in the storage area.

According to the present invention, a method for monitoring users of the novel commodity sales data processor of the invention includes detecting connection of a storage device for rewritably storing data to a data transmitting and receiving unit by an information processing unit. At this step, the data transmitting and receiving unit allowing the storage device to be connected and enabling data communication with the storage device. The method further includes storing date and time of detection of the connection in a predetermined storage area by the information processing unit. The method further includes, when the connection is detected, controlling and causing a camera to pick up an image and storing picked-up image data outputted from the camera, together with shooting date and time, in the storage area by the information processing unit. At this step, the camera picking up an image of an area embracing a user positioned in a position where the user can operate a user interface having an information input function.

DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION

Description will be given to an embodiment of the invention with reference to FIG. 1 to FIG. 6. This embodiment is an example in which the invention is applied to a POS terminal 101 installed in a store.

Figure 1:
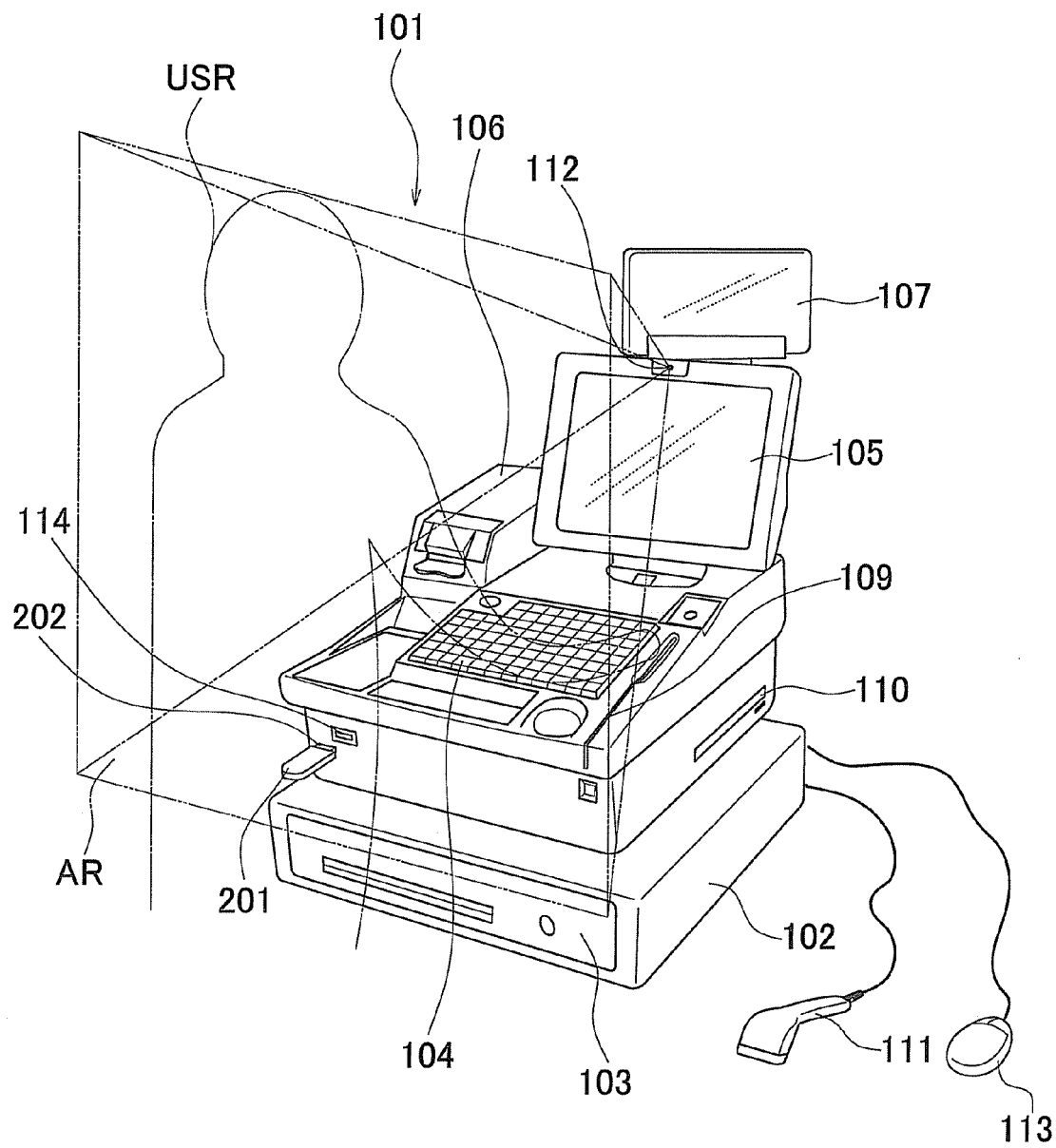
FIG. 1 is an appearance perspective view of a POS terminal.
Figure 2:
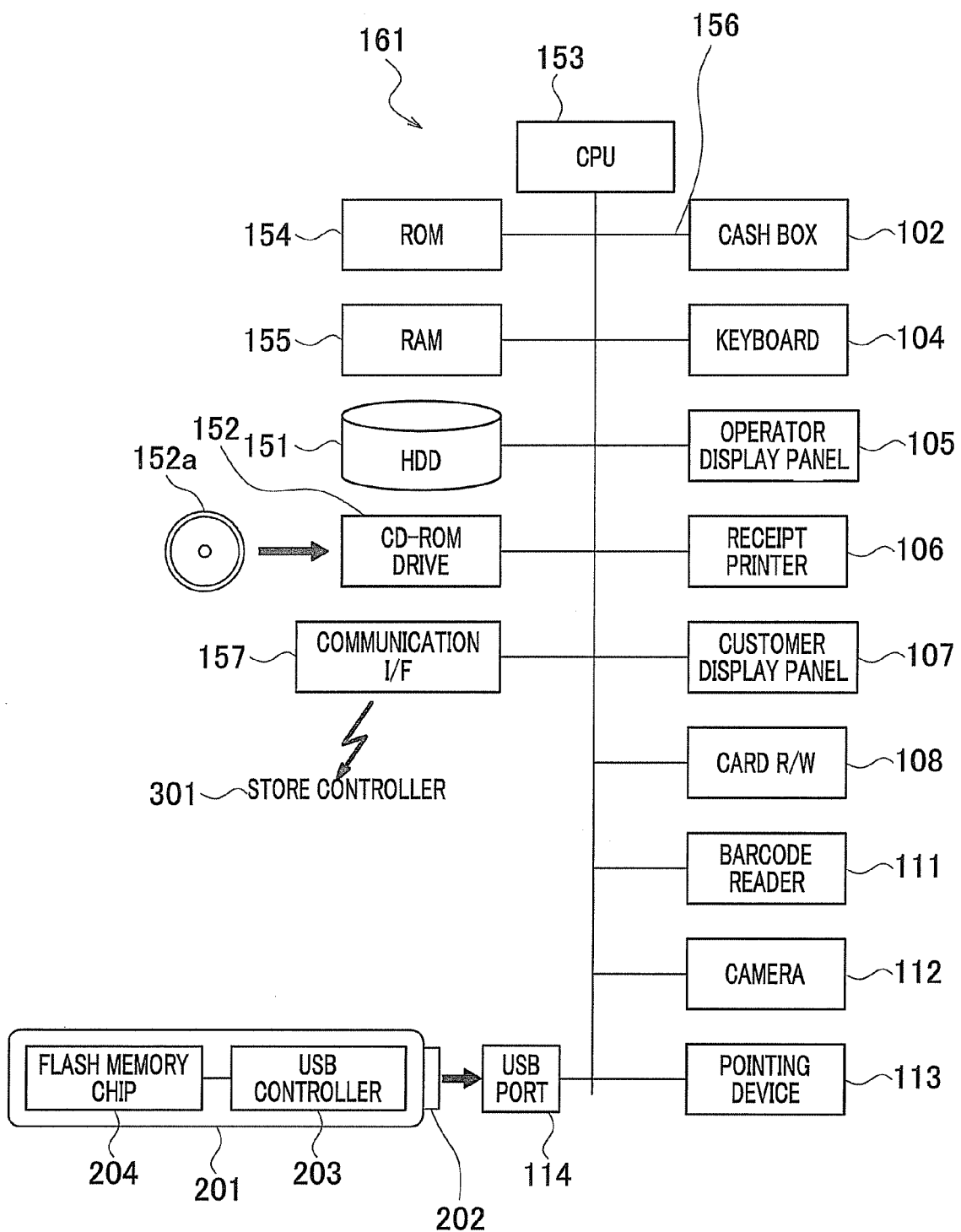
FIG. 2 is a block diagram illustrating the hardware configuration of a POS terminal.

FIG. 1 is an appearance perspective view of the POS terminal 101. The POS terminal 101 is placed on a cash box 102. The POS terminal 101 is capable of controlling the opening operation of the drawer 103 of the cash box 102. On the right side of the upper face of the POS terminal 101, there are disposed a keyboard 104 as a user interface and an operator display panel 105 as a display unit. On the left side of the upper face of the POS terminal, a receipt printer 106 is disposed. The keyboard 104 includes, for example, a numeral keypad for inputting numerals, an intermediate total key as a temporary totaling key, and a deposit/cash total key as a totaling key. The operator display panel 105 is, for example, a liquid crystal display device. At the rear part of the upper face of the POS terminal 101, a customer display panel 107 is provided. The groove provided in proximity to the right side face of the POS terminal 101 in FIG. 1 is a card read groove 109 for scanning a card to read card information or perform other like operation by a card reader/writer 108 (FIG. 2).

The POS terminal 101 includes HDD 151 (FIG. 2) and a CD-ROM drive 152 (FIG. 2) as storage devices. On the right side face of the POS terminal 101 as viewed from the operator side, there is provided a CD-ROM tray 110 for loading CD-ROM 152a (FIG. 2).

The POS terminal 101 is connected with a barcode reader 111 for optically reading the barcode affixed to each commodity (not shown). The POS terminal is also connected with a pointing device 113 for moving a cursor (not shown) displayed on the screen of the operator display panel 105 to perform various operations.

In the front face of the POS terminal 101, a USB port 114 is provided. Therefore, a USB memory 201 having a USB connector 202 can be connected to the POS terminal 101 in this embodiment. Another USB port (not shown) different from this USB port 114 may be provided, for example, in the rear face or the like of the POS terminal 101.

Further, the POS terminal 101 in this embodiment is provided with a camera 112 for picking up images, integrated with the upper frame encircling the screen of the operator display panel 105. The camera 112 is used to pick up an image of a user USR who operates the keyboard 104, pointing device 113, or the like as a user interface of the POS terminal 101. For this reason, the camera 112 in this embodiment is placed in such a direction that the camera can pick up an image of the area AR in front of the POS terminal 101 where a user USR is positioned when the user USR performs the above operations. Thus the camera 112 picks up an image of the area AR embracing a user USR positioned in a position where the user USR can operate the keyboard 104, pointing device 113, or the like. In this embodiment, further, the USB port 114 is disposed on the front face side of the POS terminal 101. Therefore, the camera 112 picks up an image of the area AR embracing a user USR who performs the operation of connecting the USB memory 201 to the USB port 114. Then the camera 112 outputs the data on the picked-up image to the microcomputer 161 (FIG. 2) of the POS terminal 101.

FIG. 2 is a block diagram illustrating the hardware configuration of the POS terminal 101. The POS terminal 101 includes the microcomputer 161. The microcomputer 161 is constructed by connecting the following members to CPU 153 that carries out varied arithmetic processing and controls each part through a bus line 156: ROM 154 for fixedly storing fixed data; and RAM 155 that rewritably stores mutable data and is used as a work area. The microcomputer 161 constitutes an information processing unit that carries out information processing.

The HDD 151 and the CD-ROM drive 152 are connected to the CPU 153 of the microcomputer 161 through the bus line 156. The following above-mentioned members are all connected to the microcomputer 161 through various input/output circuits (none of which is shown) and the bus line 156: the cash box 102, keyboard 104, operator display panel 105, receipt printer 106, customer display panel 107, card reader/writer 108, barcode reader 111, camera 112, and pointing device 113. The operation and the like of these members are controlled by the microcomputer 161.

In addition, the POS terminal 101 includes a communication interface 157 for carrying out data communication with a store controller 301 as a higher-level device through a local area network 251 provided in the store. This communication interface 157 is also connected to the bus line 156.

The microcomputer 161 is connected with the above-mentioned USB port 114 through the bus line 156. The USB connector 202 of the USB memory 201 is connected to the USB port 114. The USB port 114 enables data communication with a USB memory 201 whose USB connector 202 is connected thereto. The USB memory 201 has a USB controller 203 and a flash memory chip 204 as a nonvolatile memory. The USB controller 203 and the flash memory chip 204 are stored in a plastic enclosure. The USB controller 203 controls writing of data to the flash memory chip 204 and the like. The microcomputer 161 accesses the USB memory 201 and carries out writing and reading of data to and from the flash memory chip 204.

In the HDD 151 provided in the POS terminal 101, there are stored an operating system, various computer programs, and various data files. Each data file is stored as is saved in a folder. The operating system and some of computer programs and data files are stored, for example, in the CD-ROM 152a and are read by the CD-ROM drive 152 and stored in the HDD 151. As another example, they may be downloaded from the store controller 301 through the local area network 251 and be stored in the HDD 151. The operating system, computer programs, and data files are all or partly copied to the RAM 155 when the POS terminal 101 is started and then used.

On the mother board (not shown) of the POS terminal 101, there is mounted a real time clock (not shown) as a chip dedicated to time counting. The operating system acquires date and time from the real time clock when booted and time counting is thereafter carried out on the operating system side.

The operating system in this embodiment conforms to the USB Mass Storage Class. In the POS terminal 101, therefore, it is unnecessary to separately install a driver and the USB memory 201 connected to the USB port 114 can be recognized as a storage device by only the standard functions.

In the thus constructed POS terminal 101, commodity sales data processing is carried out according to a computer program. The commodity sales data processing is roughly processing in which the following is implemented: a unit price corresponding to a commodity code outputted from the barcode reader 111 is acquired from a commodity data file (not shown) in which commodity codes and commodity information containing unit prices are stored in correspondence with each other; and a settlement amount is computed based on the acquired unit price. Data files, which are containing acquired commodity information, computed settlement amount, and the like, are created as the result of execution of commodity sales data processing. The data files are stored as commodity sales data in the HDD 151, for example, on a transaction-by-transaction basis.

In the POS terminal 101 in this embodiment, in addition to the commodity sales data processing, the processing described below is carried out according to a computer program.

Figure 3:
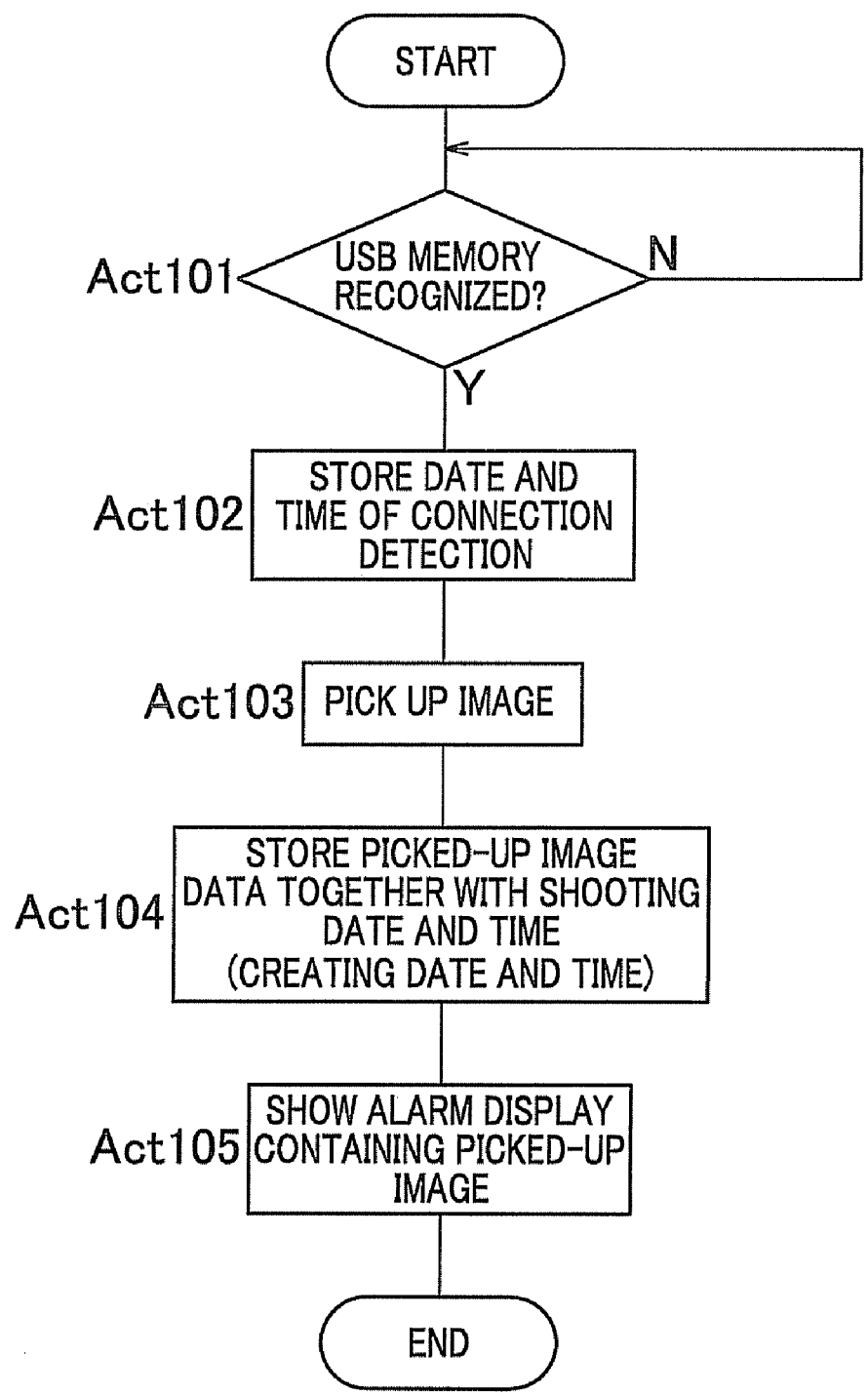
FIG. 3 is a flowchart illustrating an example of processing carried out at a POS terminal.

FIG. 3 is a flowchart illustrating an example of this processing carried out at the POS terminal 101. The microcomputer 161 of the POS terminal 101 waits until the USB connector 202 of a USB memory 201 is connected to the USB port 114 and as a result the USB memory 201 is recognized as a storage device (Act 101). That is, detecting connection of a storage device to the data transmitting and receiving unit is realized.

When the USB connector 202 is inserted into and connected to the USB port 114 and the USB memory 201 is recognized as a storage device (Y at Act 101), the microcomputer 161 carries out the following processing: it acquires date and time, counted by the operating system, as "date and time of connection detection," which is date and time when connection of the USB memory 201 to the USB port 114 was detected. Then it sequentially stores the date and time of connection detection in a connection detection log file LF (FIG. 4) (Act 102). The connection detection log file LF is a data file placed in a log folder F (FIG. 4) as a storage area formed in the HDD 151.

Figure 4:
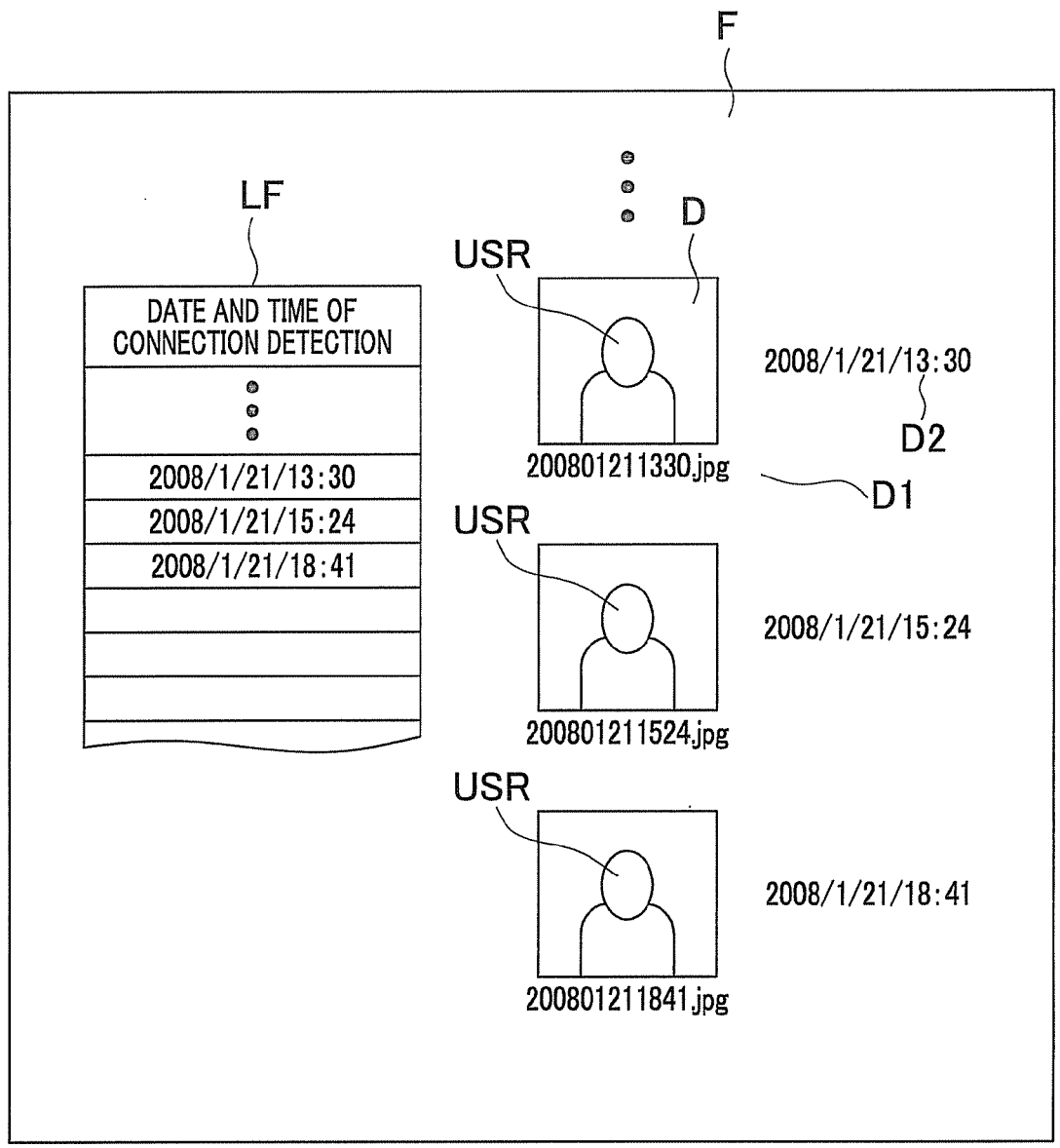
FIG. 4 is a schematic diagram illustrating the data composition of a log folder.

FIG. 4 is a schematic diagram illustrating the data composition of the log folder F. The log folder F is formed in a predetermined hierarchical level in the HDD 151. In the log folder F, there is saved the connection detection log file LF for sequentially storing "date and time of connection detection." The connection detection log file LF is, for example, plain text. Therefore, the contents of data in the connection detection log file LF can be viewed by such software as text editor.

Description will be continued referring back to FIG. 3. The microcomputer 161 drives and controls the camera 112 and causes it to pick up an image (Act 103). As mentioned above, the camera 112 is so disposed that it can pick up an image of the area AR in front of the POS terminal 101. Therefore, each image picked up by the camera 112 at Act 103 embraces the image of a user USR who is trying to operate the keyboard 104 or the like after the user USR connected the USB memory 201 to the USB port 114. Data of the picked-up image is outputted, for example, in the JPEG format from the camera 112 to the microcomputer 161.

The microcomputer 161 stores the picked-up image data, outputted from the camera 112, in the log folder F (Act 104). At this time, the microcomputer 161 acquires date and time counted by the operating system as date and time of shooting by the camera 112 and stores the acquired shooting date and time as date and time of the creation of the picked-up image data. That is, in this embodiment, picked-up image data is stored together with shooting date and time.

Description will be given to picked-up image date with reference to FIG. 4. Picked-up image data D stored in the log folder F is given a file name D1. This file name D1 is given based on the date and time when the image was picked up and the picked-up image data D was created (creating date and time D2). Specifically, when the creating date and time D2 of picked-up image data D is "13:30 on Jan. 21, 2008," "200801211330.jpg" is given as file name D1. ".jpg" contained in the file name D1 is an extension indicating the file format (JPEG format) of the picked-up image data D. The creating date and time D2 can be viewed as a property of the picked-up image data D by performing a predetermined operation using the pointing device 113 or the like. As mentioned above, the creating date and time D2 of the picked-up image data D is equivalent to the date and time when the relevant image was picked up. With respect to each picked-up image data D stored in the log folder F, therefore, the shooting date and time can be learned by referring to the creating date and time D2 of the picked-up image data D.

Description will be continued referring back to FIG. 3. The microcomputer 161 generates an alarm display W (FIG. 5) containing the picked-up image based on the picked-up image data. The microcomputer 161 shows the generated alarm display W on the operator display panel 105 for a certain time (Act 105) and then terminates the series of processing.

The processing from Act 101 to start of Act 105 is carried out in several seconds. In this embodiment, therefore, display of a picked-up image based on picked-up image data is carried out in succession to detection of connection of a USB memory 201 to the USB port 114. As a result, a user USR who has connected the USB memory 201 feels as if the picked-up image were displayed as soon as the user USR connected the USB memory.

Figure 5:
FIG. 5 is a schematic diagram illustrating an example of a display screen image of an operator display panel with an alarm display shown.

FIG. 5 is a schematic diagram illustrating an example of a screen display image on the operator display panel 105 with an alarm display W shown. The alarm display W in the example in FIG. 5 is shown in a basic screen page B displayed on the operator display panel 105 while commodity sales data processing is being carried out.

First, description will be given to the basic screen page B. In the basic screen page B, the current date and time counted by the operating system is indicated in a date and time area B1. In the basic screen page B, the name of a clerk who is signing on is also indicated in a name of person in charge area B2. In the basic screen page B, in addition, commodity information (unit price, commodity name, and the like) acquired from a commodity data file (not shown) as the result of execution of commodity sales data processing is indicated in a commodity information area B3. In the basic screen page B, further, money amount information containing a settlement amount computed by carrying out commodity sales data processing and the like is indicated in a money amount information area B4.

In the lower left area of the basic screen page B, an alarm display W encircled with a frame border striped in yellow and black. In the area in the basic screen page B where the alarm display W is shown, varied information is appropriately indicated while commodity sales data processing is being carried out.

The alarm display W contains a picked-up image W1 based on picked-up image data in the center thereof. The picked-up image W1 is the image of a user USR who has connected the USB memory 201 to the USB port 114 of the POS terminal 101. Under the picked-up image W1, there are indicated warning characters W2 composed of a character string of "Picked-Up Image Saved!" On the right of the picked-up image W1, there is indicated shooting date and time W3 based on the date and time when the picked-up image data was created.

The alarm display W may further contain information indicating that connection of a USB memory 201 has been detected. The alarm display W may also contain the date and time when the connection was detected (date and time of connection detection) has been stored.

This alarm display W makes the user USR recognize that the data of a picked-up image W1 of the user USR has been stored together with the shooting date and time. As a result, a user USR who connects a USB memory 201 to the USB port 114 in an attempt to run away with commodity sales data or the like stored in the HDD 151 of the POS terminal 101 decides to give up the intended unjustifiable act. This is because, if the unjustifiable act is carried out, the doer will be easily found out.

As mentioned above, this embodiment brings about the effect of deterring any unjustifiable act to copy commodity sales data from the POS terminal 101 to a USB memory 201 and improperly run away with the data.

Some users USR that has known that the data of the image of the user USR picked up by the camera 112 has been stored may think about erasing the picked-up image data from the POS terminal 101 for destruction of evidence. In this embodiment, to cope with this, access to the data in the log folder F is controlled. This control of access to the data in the log folder F is implemented, for example, as follows: when a user USR is going to access the data, the user USR is prompted to enter a predetermined password by a password request screen P (FIG. 6); and if this password is not entered, access to the data in the log folder F is inhibited.

Figure 6:
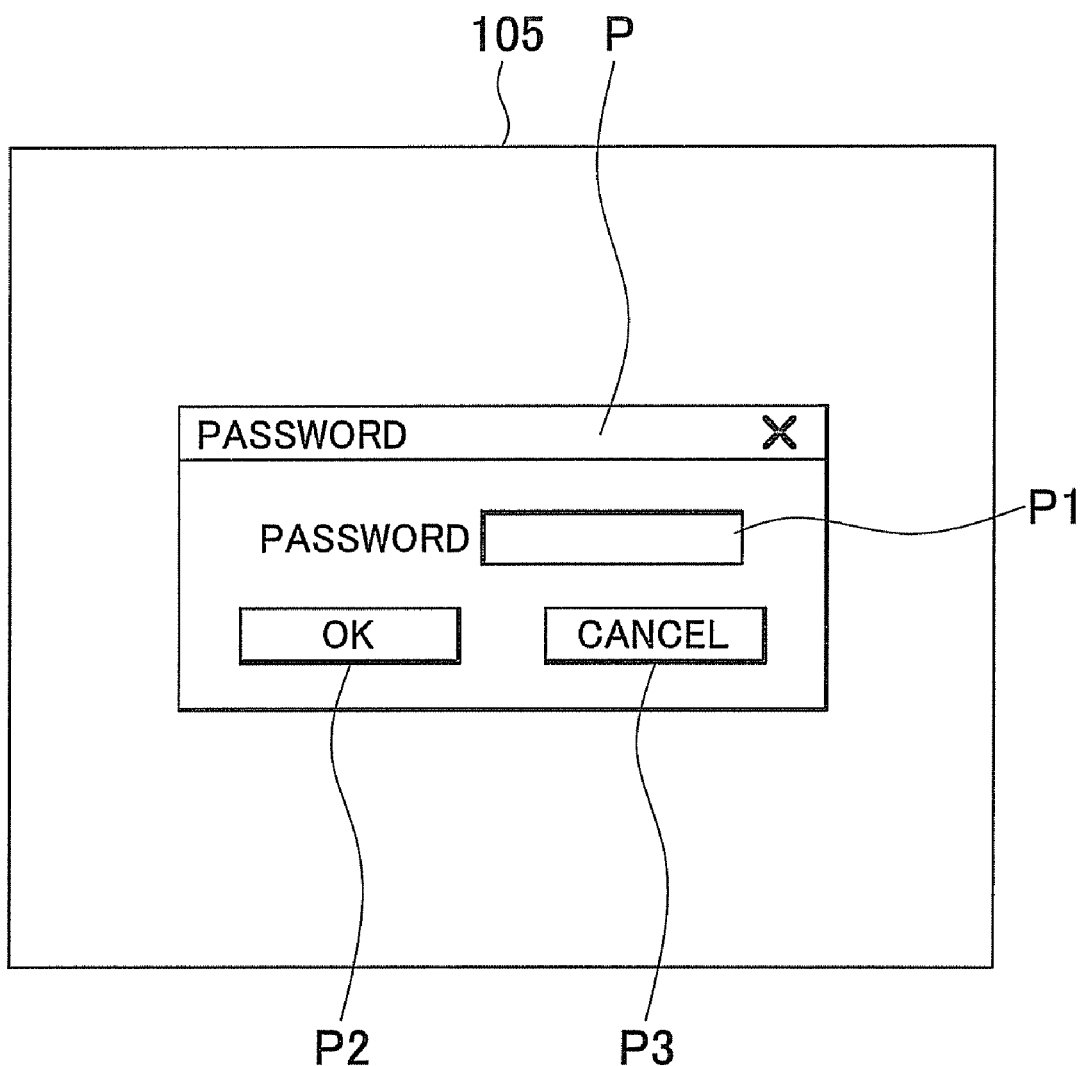
FIG. 6 is a schematic diagram illustrating an example of a screen display image of an operator display panel with a password request screen displayed.

FIG. 6 is a schematic diagram illustrating an example of a screen display image of the operator display panel 105 with the password request screen P displayed. In the example in FIG. 6, screen display images other than the password request screen P are omitted. For example, if a user USR who intends to erase picked-up image data operates the pointing device 113 to click the log folder F, the following takes place: the password request screen P is displayed in the center of the screen of the operator display panel 105 as illustrated in FIG. 6. The log folder F is not opened unless a predetermined password is entered in the entry area P1 of the password request screen P by operating the keyboard 104 and the button P2 marked with "OK" is clicked. For this reason, users who do not know the password cannot perform any operation, including accessing and erasing the data stored in the log folder F. This password only has to be known to the manager of the store. When the button P3 marked with "Cancel" is clicked, the password request screen P disappears from the operator display panel 105.

Description will be given to the processing of finding out a wrongdoer. This processing is carried out when an unjustifiable act was actually carried out and commodity sales data was taken away from the POS terminal 101 or on other like occasions. The processing at the POS terminal 101, described below, is predominantly carried out by the microcomputer 161.

First, an operator operates the pointing device 113 or the like to open the connection detection log file LF saved in the log folder F with a predetermined application. When the connection detection log file LF is, for example, plain text, this application is, for example, a text editor. In the HDD 151 of the POS terminal 101, therefore, such an application is stored. The contents (date and time of connection detection) of the data in the connection detection log file LF opened with the application are displayed on the operator display panel 105. The operator examines the dates and times of connection detection stored in the connection detection log file LF and identifies the date and time when the unjustifiable act was carried out. This identification is carried out based on the date and time when the commodity sales data was maliciously accessed or the like. Then the operator operates the pointing device 113 to examine creating date and time D2 (shooting date and time) of the picked-up image data D saved in the log folder F. At this time, the picked-up image data D saved in the log folder F is displayed on the operator display panel 105 by icon. The properties of the picked-up image data D, including the creating date and time D2 thereof, displayed by icon can be displayed by text by performing a predetermined operation. Thus the operator can identify picked-up image data D whose creating date and time D2 (shooting date and time) is close to or matched with the date and time when the unjustifiable act was carried out. The operator operates the pointing device 113 and opens this picked-up image data D with a predetermined application installed beforehand in the HDD 151. As a result, the picked-up image based on the picked-up image data D is displayed on the operator display panel 105. Thus the operator can identify the wrongdoer by this picked-up image.

Figure 7:
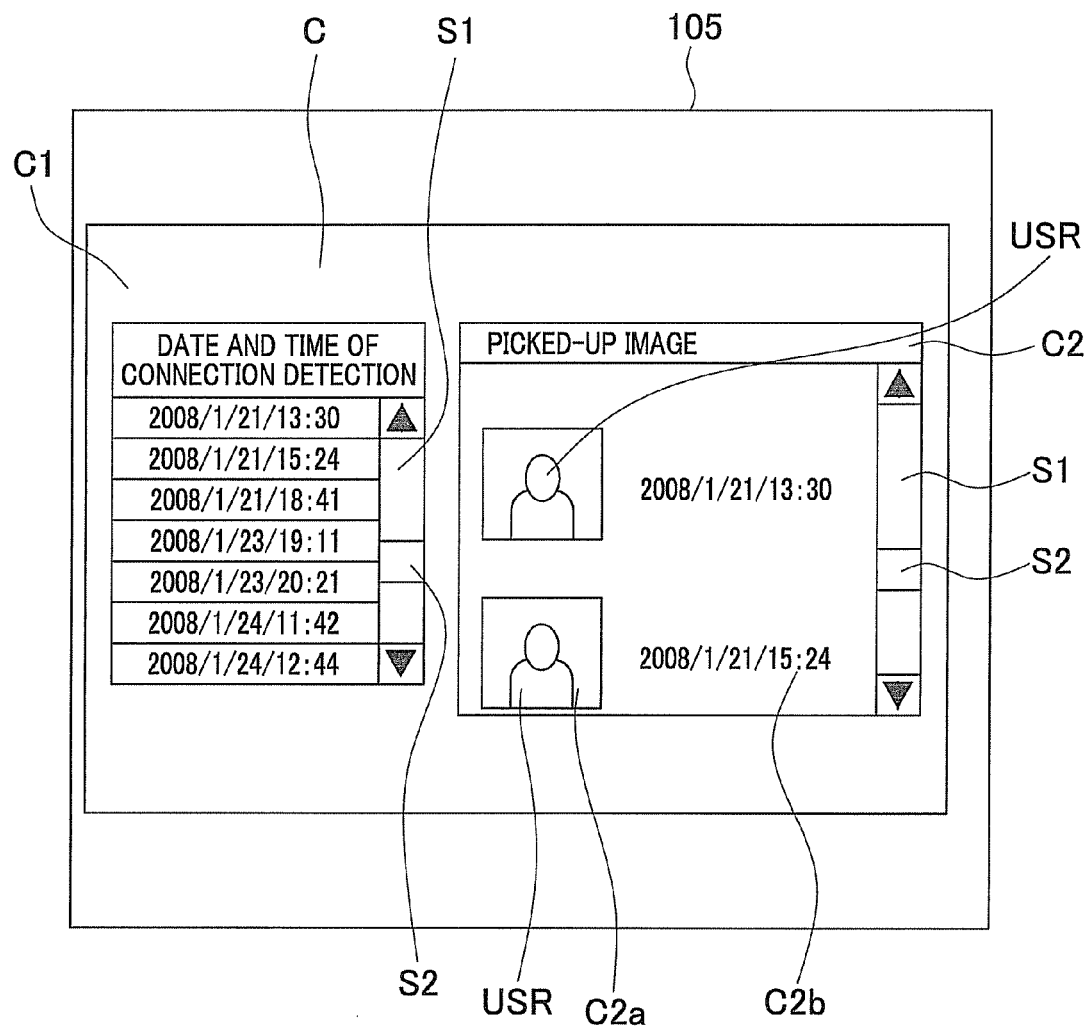
FIG. 7 is a schematic diagram illustrating an example of a screen display image of an operator display panel with a list screen displayed.

The dates and times of connection detection stored in the connection detection log file LF and picked-up images based on picked-up image data may be displayed on the operator display panel 105 in the form of list (FIG. 7).

FIG. 7 is a schematic diagram illustrating an example of a screen display image of the operator display panel 105 with a list screen C displayed. The list screen C includes a date and time of connection detection list display C1 and a picked-up image list display C2. The date and time of connection detection list display C1 indicates the dates and times of connection detection stored in the connection detection log file LF in the form of list. The picked-up image list display C2 indicates picked-up images based on picked-up image data D in the form of list. The date and time of connection detection list display C1 and the picked-up image list display C2 indicate only part of the contents thereof. The remaining part can be indicated by operating the pointing device 113 to move up or down the scroll box S2 of the scroll bar S1 positioned on the right of each display.

The picked-up image list display C2 in the list screen C includes picked-up images C2a based on picked-up image data and shooting dates and times C2b as illustrated in FIG. 7. The picked-up images C2a and the shooting dates and times C2b are displayed in correspondence and alignment with each other in the horizontal direction of the display screen page. The shooting dates and times C2b are based on the creating date and time D2 in the picked-up image data D stored in the log folder F.

This list screen C is displayed on the operator display panel 105 by the microcomputer 161 according to a computer program installed in the HDD 151 in response to a predetermined operation of the pointing device 113. In the list screen C, picked-up images C2a and shooting dates and times C2b are displayed together with dates and times of connection detection. Therefore, it is easy for the operator to identify a picked-up image whose shooting date and time is close to or matched with the date and time when an unjustifiable act was carried out.

Obviously, numerous modifications and variations of the present invention are possible in light of the above teachings. It is therefore to be understood that within the scope of the appended claims, the invention may be practiced otherwise than as specifically described herein.

What is claimed is:

1. A commodity sales data processor, comprising:
a user interface for commodity sales having an information input function;
a camera picking up an image of an area embracing a user positioned in a position where the user can operate the user interface and outputting picked-up image data;
a data transmitting and receiving unit allowing a storage device for rewritably storing data to be connected and enabling data communication with the storage device; a display unit configured to display the user interface; and an information processing unit which executes:
a detecting process of detecting connection of the storage device to the data transmitting and receiving unit;
a process of storing the date and time of detection of the connection in a predetermined storage area;
a process of, when the connection is detected, controlling and causing the camera to pick up an image and storing picked-up image data outputted from the camera and shooting date and time together in the storage area;
a process of displaying a picked-up image based on the picked-up image data outputted from the camera on the display unit;
a process of displaying names of sign-on users on the display unit; and a process of displaying a predetermined warning message indicating that the picked-up image is stored with the picked-up image based on the picked-up image data on the display unit,
wherein the information processing unit successively executes the detecting process and the process of displaying the picked-up image; wherein the information processing unit carries out a process of controlling access to data in the storage area; and wherein the data transmitting and receiving unit is a USB port, wherein the storage device is a USB memory having a USB connector connectable to the USB port, and wherein the camera is disposed in such a position that an image of an area embracing a user positioned in a position where the user can operate the USB port can be picked up.

2. A monitoring method for a user of a commodity sales data processor, comprising:
- detecting connection of a storage device for rewritably storing data to a data transmitting and receiving unit by an information processing unit, wherein the data transmitting and receiving unit allowing the storage device to be connected and enabling data communication with the storage device;
- storing date and time of detection of the connection in a predetermined storage area by the information processing unit;
- when the connection is detected, controlling and causing a camera to pick up an image and storing picked-up image data outputted from the camera, together with shooting date and time, in the storage area by the information processing unit, wherein the camera picking up an image of an area embracing a user positioned in a position where the user can operate a user interface having an information input function;
- displaying a picked-up image based on the picked-up image data outputted from the camera on a display unit having an information display function by the information processing unit in succession to the detecting;
- displaying names of sign-on users on the display unit;
- displaying a predetermined warning message indicating that the picked-up image is stored with the picked-up image based on the picked-up image data on the display unit by the information processing unit; further comprising controlling access to data in the storage area by the information processing unit; and wherein the data transmitting and receiving unit is a USB port, wherein the storage device is a USB memory having a USB connector connectable to the USB port, and wherein the camera is disposed in such a position that an image of an area embracing a user positioned in a position where the user can operate the USB port can be picked up.

* * * * *